United States Patent
Matsuoka et al.

(10) Patent No.: US 8,523,790 B2
(45) Date of Patent: *Sep. 3, 2013

(54) WALKING ASSISTANCE DEVICE

(75) Inventors: Yoshihisa Matsuoka, Tochigi (JP); Yasushi Ikeuchi, Wako (JP); Yutaka Hiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 891 days.

This patent is subject to a terminal disclaimer.

(21) Appl. No.: 12/610,725

(22) Filed: Nov. 2, 2009

(65) Prior Publication Data

US 2010/0113989 A1     May 6, 2010

(30) Foreign Application Priority Data

Nov. 5, 2008   (JP) ................. 2008-284818

(51) Int. Cl.
*A61H 1/00*     (2006.01)
*A61H 1/02*     (2006.01)
*A61H 5/00*     (2006.01)

(52) U.S. Cl.
USPC ................ 601/5; 601/35; 602/16; 602/23

(58) Field of Classification Search
USPC ........... 601/5, 23, 27, 29, 33, 34, 35; 602/16, 602/23, 26; 623/24, 27, 31, 32, 39
See application file for complete search history.

(56) References Cited

U.S. PATENT DOCUMENTS

| | | | | |
|---|---|---|---|---|
| 2,010,482 | A * | 8/1935 | Cobb | 623/31 |
| 4,651,719 | A * | 3/1987 | Funk et al. | 601/33 |
| 5,083,626 | A * | 1/1992 | Abe et al. | 180/445 |
| 5,129,273 | A * | 7/1992 | Fukui et al. | 74/89.35 |
| 5,285,773 | A * | 2/1994 | Bonutti et al. | 601/34 |

(Continued)

FOREIGN PATENT DOCUMENTS

| JP | 02-019660 | 1/1990 |
|---|---|---|
| JP | 2002-523687 | 7/2002 |

(Continued)

*Primary Examiner* — Justine Yu
*Assistant Examiner* — Raymond G Chen
(74) *Attorney, Agent, or Firm* — Rankin, Hill & Clark LLP

(57) ABSTRACT

A walking assistance device has a drive mechanism for driving a third joint of a leg link of the walking assistance device, the drive mechanism including a crank arm secured to a lower link member and a linear-motion actuator which has a linear-motion output shaft connected to the crank arm. The angle formed by a straight line connecting a joint axis of the third joint and a connecting portion of the linear-motion output shaft relative to the crank arm and a straight line which passes the connecting portion and which is parallel to the axial center of the linear-motion output shaft changes from an angle closer to the straight angle toward an angle closer to the right angle as the flexion degree of the leg link is increased from a flexion degree corresponding to a state wherein a user is in an upright posture.

10 Claims, 7 Drawing Sheets

(56) References Cited

U.S. PATENT DOCUMENTS

| | | | | |
|---|---|---|---|---|
| 5,337,737 | A * | 8/1994 | Rubin et al. | 601/33 |
| 5,343,856 | A * | 9/1994 | Proctor | 601/35 |
| 5,669,873 | A * | 9/1997 | Towsley | 602/26 |
| 5,728,172 | A * | 3/1998 | Krieger | 623/44 |
| 6,586,854 | B1 * | 7/2003 | Nozawa et al. | 310/83 |
| 6,676,707 | B2 * | 1/2004 | Yih et al. | 623/24 |
| 2004/0116839 | A1 * | 6/2004 | Sarkodie-Gyan | 601/35 |
| 2006/0270951 | A1 * | 11/2006 | Ikeuchi | 601/5 |
| 2007/0056592 | A1 * | 3/2007 | Angold et al. | 128/845 |
| 2007/0233279 | A1 * | 10/2007 | Kazerooni et al. | 623/24 |
| 2010/0069798 | A1 * | 3/2010 | Cheng et al. | 601/5 |

FOREIGN PATENT DOCUMENTS

| | | |
|---|---|---|
| JP | 2006-043871 | 2/2006 |
| JP | 2007-029633 | 2/2007 |
| JP | 2008-012224 | 1/2008 |
| WO | 00/10775 | 3/2000 |

* cited by examiner

# WALKING ASSISTANCE DEVICE

BACKGROUND OF THE INVENTION

1. Field of the Invention

The present invention relates to a walking assistance device which assists a user (person) with walking.

2. Description of the Related Art

Hitherto, as this type of walking assistance device, Japanese Patent Application Laid-Open No. 2007-29633 (hereinafter referred to as "patent document 1"), for example, discloses one proposed by the present applicant. This walking assistance device has a load transmit portion on which a user sits astride, foot-worn portions to be attached to the feet of the user, and leg links which connect the foot-worn portions to the load transmit portion. In this case, each of the leg links is constructed of an upper link member extended from the load transmit portion through the intermediary of a first joint, a lower link member extended from the foot-worn portion through the intermediary of a second joint, and a third joint which bendably connects the upper link member and the lower link member. Further, the third joint is driven by a drive source (actuator) mounted on the upper link member. The third joint is driven to cause load for supporting a part of the weight of the user (an upward translational force) to act on the body trunk of the user through the intermediary of the load transmit portion. Thus, a burden on a leg or legs of the user is reduced.

In the walking assistance device disclosed in the aforesaid patent document 1, the drive source for driving the third joint has an electric motor mounted on an upper portion of the upper link member. The rotational driving force of the electric motor is transmitted to the lower link member through the intermediary of a wire and a pulley, thereby imparting a torque about a joint axis of the third joint to the lower link member. In this case, the torque imparted to the lower link member is proportional to an output torque of the electric motor. Further, the rotational speed of the third joint, that is, the relative rotational speed of the lower link member with respect to the upper link member, is proportional to the rotational speed of the electric motor.

Meanwhile, according to the walking assistance device disclosed in patent document 1, in order to maintain load to be applied to a user from the load transmit portion at target load while the user is walking, it is necessary to increase the torque to be imparted to the lower link member as the flexion degree of the leg link at the third joint increases, that is, as the leg link flexes at the third joint. This is because, as the flexion degree of the leg link increases, the distance between the line of action of load applied to the body trunk of the user from the load transmit portion and the third joint increases accordingly, and consequently, the torque of the third joint required to generate the target load increases.

Thus, according to the conventional walking assistance device disclosed in patent document 1, in order to maintain the load to be applied to the user from the load transmit portion at target load, it has been necessary to increase the output torque of the electric motor as the flexion degree of the leg link increases.

In the conventional walking assistance device, therefore, the maximum value of an output torque required of the electric motor and the variation width of a required output torque (the difference between the maximum value and the minimum value of a required output torque) have been inconveniently large.

Especially in the case where the flexion degree of the leg link at the third joint is small, i.e., when the leg link is stretched or nearly stretched, the sensitivity to a change in the height of the load transmit portion in response to a change in the flexion degree becomes very low, as compared with the case where the flexion degree is relatively large. In other words, as the flexion degree of the leg link decreases, the change amount of the flexion degree of the leg link required to change the height of the load transmit portion by a predetermined very small amount increases. Therefore, in the case where the user attempts to vertically move his/her body trunk especially with a small flexion degree of the leg link at the third joint, it is necessary to change the flexion degree of the leg link relatively promptly in order to vertically move the load transmit portion by promptly following the user's attempted motion. This means that the rotational speed of the third joint required to make the load transmit portion promptly follow the vertical movement of the body trunk of the user (the rotational speed of the lower link member relative to the upper link member) becomes higher as the flexion degree of the leg link at the third joint becomes smaller (as the leg link approaches its stretched state).

Hence, in the conventional walking assistance device, the maximum value of the rotational speed required of the electric motor and the variation width of a required rotational speed (the difference between the maximum value and the minimum value of a required rotational speed) have been inconveniently large.

As described above, the maximum value and variation width of an output torque required of the electric motor and the maximum value and variation width of a required rotational speed thereof are large. This has been making it difficult to reduce the size, weight or cost of a drive mechanism, including the electric motor.

SUMMARY OF THE INVENTION

The present invention has been made in view of the problems described above, and an object of the present invention is to provide a walking assistance device capable of reducing the maximum value and the variation width of an output of an actuator required to drive a leg link or the maximum value and the variation width of an operating speed of the actuator. Consequently, an object of the present invention is to provide a walking assistance device capable of easily achieving a reduced size, a reduced weight or reduced cost of the actuator.

To this end, the present invention provides a walking assistance device including a load transmit portion which transmits load for supporting a part of the weight of a user to a body trunk of the user; a foot-worn portion to be attached to a foot of the user; a leg link which connects the foot-worn portion to the load transmit portion, the leg link comprising an upper link member extended from the load transmit portion via a first joint, a lower link member extended from the foot-worn portion via a second joint, and a third joint which bendably connects the upper link member and the lower link member; and a drive mechanism for driving the third joint, wherein the drive mechanism has a crank arm fixed to the lower link member concentrically with the joint axis of the third joint and a linear-motion actuator which has a linear-motion output shaft, one end thereof being connected to the crank arm, and which is mounted on the upper link member such that the linear-motion actuator may swing about the axial center of a swing shaft parallel to a joint axis of the third joint, and the drive mechanism is constructed to convert a translational force output from the linear-motion output shaft of the linear-motion actuator into a rotational driving force for the third joint through the intermediary of the crank arm, and a relationship between a first angle and a flexion degree of a leg link at the third joint is set such that a first angle, which is an angle formed by a straight line connecting a joint axis and a connecting portion of the linear-motion output shaft relative to the crank arm, as observed in the direction of the axial center of the joint axis of the third joint, and a straight line which passes the connecting portion and which is in a direction parallel to the axial center of the linear-motion output shaft, changes from an angle on a straight angle side toward an angle on a right angle side as the flexion degree of the leg link at the third joint is increased from a flexion degree associated with an upright posture state of the user (a first aspect of the invention).

In the present invention, the term "the upright posture state of a user" means a state wherein a user is standing with his/her both legs stretched straight.

In the walking assistance device according to the first aspect of the invention, the drive mechanism converts a translational force output from the linear-motion output shaft of the linear-motion actuator (a translational force in the direction of the axial center of the linear-motion output shaft) into a rotational driving force for the third joint through the intermediary of the crank arm. Then, the drive mechanism drives the third joint by the rotational driving force. In other words, the drive mechanism rotationally drives the lower link member about the joint axis of the third joint relative to the upper link member. In this case, even if the translational force output from the linear-motion output shaft remains constant, the rotational driving force for the third joint changes according to the first angle. This means that the rotational driving force for the third joint reaches a maximum value when the first angle is a right angle. Then, as the first angle changes from this state toward an increasing side or a decreasing side, the rotational driving force for the third joint decreases. The term "straight angle" of the first angle means an angle in a state wherein the straight line connecting the joint axis and the connecting portion of the linear-motion output shaft relative to the crank arm, as observed in the direction of the axial center of the joint axis of the third joint, becomes in alignment with the straight line which passes the connecting portion and which is in the direction parallel to the axial center of the linear-motion output shaft.

Further, the sensitivity to a change in the first angle in response to a displacement of the linear-motion output shaft in the direction of the axial center reaches a minimum value when the first angle is the right angle. Then, as the first angle changes from this state toward the increasing side or the decreasing side, the sensitivity increases. An increase in the sensitivity means an increase in the change amount of the first angle when the linear-motion output shaft is displaced in the direction of the axial center by a predetermined extremely small amount, which consequently means an increase in the rotational amount of the lower link member relative to the upper link member.

Meanwhile, the rotational driving force for the third joint required to maintain load, i.e., an upward translational force, to be applied from the load transmit portion no the user at a constant level increases as the flexion degree of the leg link at the third joint increases, i.e., as the leg link bends at the third joint. The rotational speed of the third joint (the rotational speed of the lower link member relative to the upper link member) required to ensure quick response of the load transmit portion to a vertical movement of the body trunk of the user increases as the flexion degree of the leg link decreases (as the leg link stretches).

According to the first aspect of the invention, therefore, the relationship between the first angle and the flexion degree of the leg link is set such that the first angle changes from an angle on the straight angle side toward an angle on the right angle side as the flexion degree of the leg link at the third joint increases from a flexion degree corresponding to an upright posture state of the user. The set relationship makes it possible to increase the rotational driving force for the third joint as the flexion degree of the leg link increases in the case where the translational force output from the linear-motion output shaft remains constant. Thus, the load to be applied to the user from the load transmit portion can be maintained at a constant level without significantly changing the translational force output from the linear-motion output shaft according to the flexion degree of the leg link.

Moreover, the sensitivity to a change in the first angle relative to the displacement of the linear-motion output shaft in the direction of the axial center of the linear-motion output shaft with a consequent sensitivity to the angular displacement of the third joint can be increased as the flexion degree of the leg link decreases. This arrangement enables the load transmit portion to promptly follow a vertical movement of the body trunk of the user without the need for significantly changing the speed of the displacement of the linear-motion output shaft in the direction of the axial center according to the flexion degree of the leg link.

Thus, the first aspect of the invention makes it possible to reduce the maximum value and the variation width of a motive power, i.e., a translational force output from the linear-motion output shaft, required of the linear-motion actuator and to reduce the maximum value and the variation width of a required displacement speed of the linear-motion output shaft. This in turn makes it possible to easily achieve a smaller size, a lighter weight, or lower cost of the linear-motion actuator.

In the first aspect of the invention described above, the relationship between the first angle and the flexion degree of the leg link at the third joint is preferably set such that the value of the first angle in the case where the flexion degree of the leg link is the flexion degree associated with the upright posture state of the user (hereinafter referred to as "the first angle value in upright posture" in some cases) is an angle value which is closer to the straight angle rather than the right angle (a second aspect of the invention). In other words, the relationship between the first angle and the flexion degree of the leg link at the third joint is preferably set such that the difference between the first angle value in upright posture and the straight angle will be extremely small, as compared with the difference between the first angle value in upright posture and the right angle.

According to the second aspect of the present invention, the rotational driving force for the third joint (the rotational driving force when the translational force output from the linear-motion output shaft is constant) can be increased as the flexion degree of the leg link increases over the entire range or the majority of the range of the flexion degree of the leg link implemented during a leg motion when the user is walking. In addition, over the entire range or the majority of the range, the sensitivity to an angular displacement of the third joint relative to a displacement in the direction of the axial center of the linear-motion output shaft (the sensitivity to a change in the rotational angle of the lower link member relative to the upper link member) can be increased as the flexion degree of the leg link decreases.

Thus, the second aspect of the present invention makes it possible to minimize the maximum value and the variation width of a motive power, i.e., a translational force output from the linear-motion output shaft, required of the linear-motion actuator and to minimize the maximum value and the variation width of a displacement speed of the linear-motion output shaft. This in turn makes it possible to further optimally achieve a smaller size, a lighter weight, or lower cost of the linear-motion actuator.

According to the first aspect and the second aspect of the present invention, the linear-motion actuator is constructed of, for example, a ball screw device. More specifically, the linear-motion actuator has the linear-motion output shaft functioning as a screw shaft with thread grooves formed in the outer peripheral surface thereof, a nut member which retains, in the inner peripheral portion thereof, a plurality of balls engaged with the thread grooves of the linear-motion output shaft and which is concentrically threaded to the linear-motion output shaft through the intermediary of the plurality of balls, an enclosure which rotatably accommodates the nut member therein and which is supported by the upper link member such that the enclosure may swing about the axial center of the swing shaft together with the nut member and the linear-motion output shaft, and a rotational actuator which has a rotational output shaft for imparting a rotational driving force to the nut member and which is installed to the enclosure such that the rotational actuator may swing about the axial center of the swing shaft together with the enclosure. In this case, the swing shaft is preferably provided such that the axial center thereof is orthogonal to the axial center of the nut member at inside the nut member (a third aspect of the invention).

According to the third aspect of the present invention, the linear-motion actuator converts the rotational driving force of the rotational actuator into the motive power (translational force) in the direction of the axial center of the linear-motion output shaft through the intermediary of the ball screw device having the nut member and the linear-motion output shaft, which is the screw shaft, thus allowing necessary motive powers to be generated efficiently and stably. In this case, the swing shaft is provided such that the axial center thereof is orthogonal to the axial center of the nut member at inside the nut member. This arrangement makes it possible to restrain a bending force from acting on the linear-motion output shaft at inside the nut member as much as possible when the entire linear-motion actuator swings about the axial center of the swing shaft as the leg link flexes or stretches. As a result, the linear-motion output shaft can be moved in the direction of the axial center stably and smoothly as the nut member is rotationally driven without the need for a guide member for guiding the movement of the linear-motion output shaft in the direction of the axial center thereof or other components dedicated for restraining the bending force.

In the third aspect of the invention, preferably, the nut member is rotatably supported by the enclosure through the intermediary of a pair of angular bearings inserted in the outer periphery of the nut member with an interval provided in the direction of the axial center of the nut member, a side wall of the enclosure has an opening in a place within the interval between the pair of angular bearings, and the swing shaft is inserted in a bearing member attached to the enclosure such that the bearing member is accommodated in the opening between the pair of angular bearings (a fourth aspect of the invention).

According to the fourth aspect of the invention, the bearing member into which the swing shaft is inserted is attached to the enclosure such that the bearing member is accommodated in the opening between the pair of angular bearings (in other words, such that the bearing member does not project out of the enclosure). Hence, the width of the swing shaft of the linear-motion actuator in the direction of the axial center thereof can be minimized. This makes it possible to prevent leg links and the linear-motion actuators of the walking assistance device from expanding in the lateral direction of the user.

DESCRIPTION OF THE PREFERRED EMBODIMENTS

The following will describe an embodiment of a walking assistance device in accordance with the present invention with reference to FIG. 1 to FIG. 9.

Figure 1:
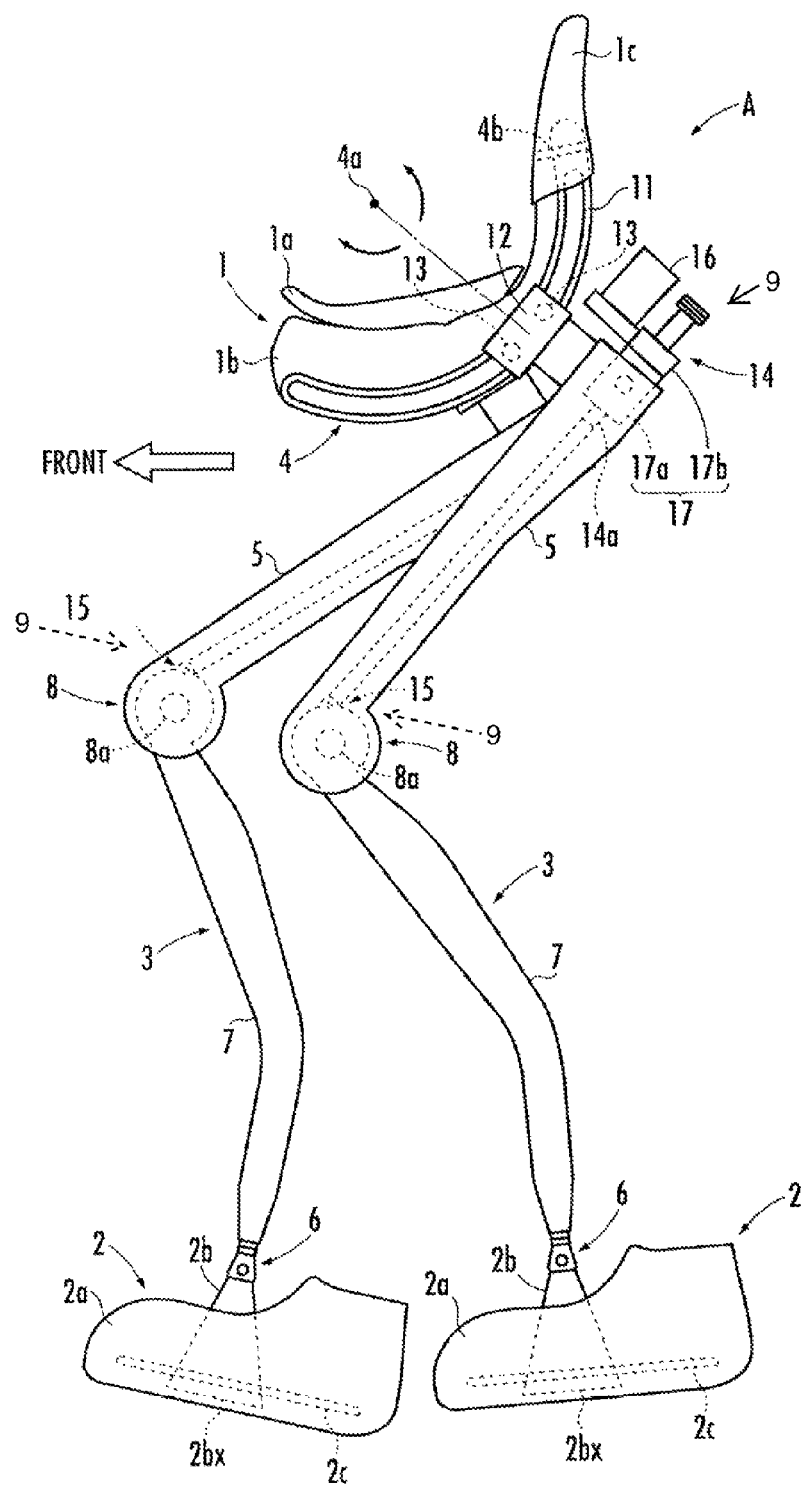
FIG. 1 is a side view illustrating a schematic construction of a walking assistance device according to an embodiment of the present invention.

FIG. 1 is a side view illustrating a schematic construction of a walking assistance device A of the present embodiment. As illustrated in FIG. 1, the walking assistance device A is provided with a seating portion 1 serving as a load transmit portion, a pair of right and left foot-worn portions 2 and 2 to be attached to the feet of individual legs of a user (not shown), and a pair of right and left leg links 3 and 3 which connect the foot-worn portions 2 and 2, respectively, to the seating portion 1. The right and left foot-worn portions are laterally symmetrical to each other and share the same structure. The right and left leg links 3 and 3 are also laterally symmetrical to each other and share the same structure. In the description of the present embodiment, the lateral direction of the walking assistance device A means the lateral direction of the user having the foot-worn portions 2 and 2 attached to his or her feet (the direction substantially perpendicular to the paper surface in FIG. 1).

Each of the leg links 3 is constituted of an upper link member 5 extended downward from the seating portion 1 via a first joint 4, a lower link member 7 extended upward from the foot-worn portion 2 via a second joint 6, and a third joint 8 which bendably connects the upper link member 5 and the lower link member 7 between the first joint 4 and the second joint 6.

Further, the walking assistance device A has a drive mechanism 9 for driving the third joint 8 for each leg link 3. The drive mechanism 9 of the left leg link 3 and the drive mechanism 9 of the right leg link 3 are laterally symmetrical and share the same structure. Regarding the drive mechanism 9 of the right leg link 3, a part of the drive mechanism 9 in FIG. 1 is omitted for easy understanding of the illustration.

The seating portion 1 is constituted of a saddle-shaped seat 1a disposed such that the seat 1a is positioned between the proximal ends of the two legs of a user when the user sits thereon astride, a base frame 1b attached to the bottom surface of the seat 1a, and a hip pad 1c attached to the rear end portion of the base frame 1b, i.e., the portion that rises upward at the rear of the seat 1a.

The first joint 4 of each of the leg links 3 is a joint which has a freedom degree (2 degrees of freedom) of rotation about two joint axes, namely, in the longitudinal direction and the lateral direction. More specifically, each of the first joints 4 has an arcuate guide rail 11 attached to the base frame 1b of the seating portion 1. A slider 12, which is secured to the upper end of the upper link member 5 of each of the leg links 3, movably engages the guide rail 11 through the intermediary of a plurality of rollers 13 rotatably attached to the slider 12. This arrangement enables each of the leg links 3 to effect a swing motion in the longitudinal direction (a longitudinal swing-out motion) about a first joint axis of the first joint, taking the lateral axis passing a curvature center 4a of the guide rail 11 (more specifically, the axis in the direction perpendicular to a plane that includes the arc of the guide rail 11) as a first joint axis of the first joint 4.

Further, the guide rail 11 is rotatably supported at the rear upper end of the base frame 1b of the seating portion 1 through the intermediary of a support shaft 4b having the axial center thereof oriented in the longitudinal direction, so that the guide rail 11 is allowed to swing about the axial center of the support shaft 4b. This arrangement enables each of the leg links 3 to effect a lateral swing motion (adduction/abduction motion) about a second joint axis of the first joint 4, taking the axial center of the support shaft 4b as the second joint axis of the first joint 4. In the present embodiment, the second joint axis of the first joint 4 provides a joint axis common to the right first joint 4 and the left first joint 4.

As described above, the first joint 4 is constructed to allow each of the leg links 3 to effect swing motions about the two joint axes, namely, in the longitudinal direction and the lateral direction.

The degree of the rotational freedom of the first joint is not limited to two. Alternatively, the first joint may be constructed to have, for example, a freedom degree of rotation about three joint axes, i.e., three degrees of freedom. Further alternatively, the first joint may be constructed to have, for example, a freedom degree of rotation about only one joint axis in the lateral direction, i.e., one degree of freedom.

Each of the foot-worn portions 2 has a shoe 2a for the user to wear on a foot and a connecting member 2b projecting upward from inside the shoe 2a. Each leg of the user lands on the ground through the shoe 2a in a state wherein the leg is a standing leg, i.e., a supporting leg. The lower end of the lower link member 7 of each of the leg links 3 is connected to the connecting member 2b via the second joint 6. In this case, the connecting member 2b has, as an integral part thereof, a flat-plate-like portion 2bx disposed under an insole 2c in the shoe 2a (between the bottom of the shoe 2a and the insole 2c). The connecting member 2b, including the flat-plate-like portion 2bx, is formed of a member having relatively high rigidity such that, when the foot-worn portion 2 is landed, a part of a floor reaction force acting from a floor onto the foot-worn portion 2 (a translational force which is large enough to support the weight combining at least the walking assistance device A and a part of the weight of the user) can be applied to the leg link 3 through the intermediary of the connecting member 2b and the second joint 6.

The foot-worn portion 2 may have, for example, slipper-like footwear in place of the shoe 2a.

The second joint 6 in the present embodiment is constituted of a free joint, such as a ball joint, and has a freedom degree of rotation about three axes. However, the second joint may alternatively be a joint having a freedom degree of rotation about, for example, two axes in the longitudinal and lateral directions or two axes in the vertical and lateral directions.

The third joint 8 is a joint having a freedom degree of rotation about one axis in the lateral direction and has a support shaft 8a rotatably supporting the upper end of the lower link member 7 to the lower end of the upper link member 5. The axial center of the support shaft 8a is substantially parallel to the first joint axis of the first joint 4 (the axis in a direction perpendicular to a plane which includes the arc of the guide rail 11). The axial center of the support shaft 8a provides the joint axis of the third joint 8, and the lower link member 7 can be relatively rotated about the joint axis with respect to the upper link member 5. This allows the leg link 3 to stretch or bend at the third joint 8.

In order to apply a load for supporting a part of the weight of the user sitting on the seating portion 1 (an upward translational force) to the user from the seating portion 1, each of the drive mechanisms 9 imparts a rotational driving force (torque) in the direction in which the leg link 3 stretches to the third joint 8 of the leg link 3 having the foot-worn portion 2 thereof in contact with the ground. The drive mechanism 9 is mounted on the upper link member 5 of the leg link 3 and constituted of a linear-motion actuator 14 having a linear-motion output shaft 14a and a motive power transmit mechanism 15 which converts motive power output from the linear-motion output shaft 14a, i.e., a translational force in the axial direction of the linear-motion output shaft 14a, into a rotational driving force and transmits the rotational driving force to the third joint 8.

The following will describe the details of the drive mechanism 9 with reference to FIG. 2 to FIG. 5.

Figure 2:
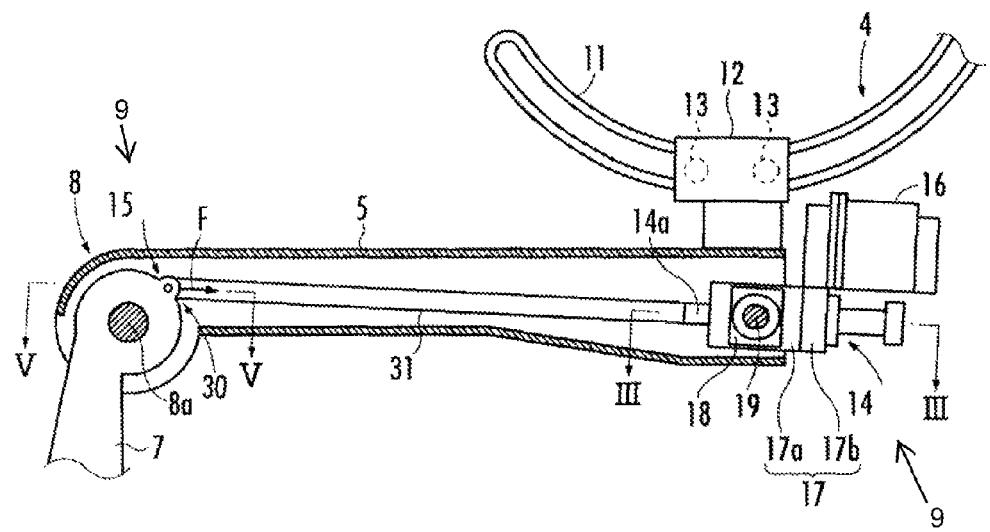
FIG. 2 is a diagram illustrating an upper link member of the walking assistance device in FIG. 1, the upper link member having been partly broken away.

The upper link member 5 to which the drive mechanism 9 is installed has a hollow structure which is open at the end thereof adjacent to the first joint 4 (hereinafter referred to as "the end at the hip side") and at the end thereof adjacent to the third joint 8 (hereinafter referred to as "the end at the knee side), as illustrated in FIG. 2. The linear-motion actuator 14 of the drive mechanism 9 is disposed at a location on the upper link member 5 adjacent to the end at the hip side. The motive power transmit mechanism 15 is accommodated in the upper link member 5, extending from the location adjacent to the end at the hip side of the upper link member 5 to the location adjacent to the end at the knee side.

The linear-motion actuator 14 has an electric motor 16 serving as a rotary actuator and an enclosure 17 accommodating mainly a ball screw for converting a rotational driving force (torque) output from the electric motor 16 into a translational force in the direction of the axial center of the linear-motion output shaft 14a. In this case, the enclosure 17 is composed of a main enclosure 17a, which has an approximately square-tubular shape, and a hollow subsidiary enclosure 17b secured to one end of the main enclosure 17a. A linear-motion output shaft 14a penetrates the main enclosure 17a and the subsidiary enclosure 17b. The enclosure 17 is disposed adjacently to the end at the hip side of the upper link member 5 such that the main enclosure 17a and the subsidiary enclosure 17b are positioned on the inner side and the outer side, 2D respectively, of the upper link member 5, and the axial center of the linear-motion output shaft 14a is approximately oriented in the lengthwise direction of the upper link member 5.

Figure 3:
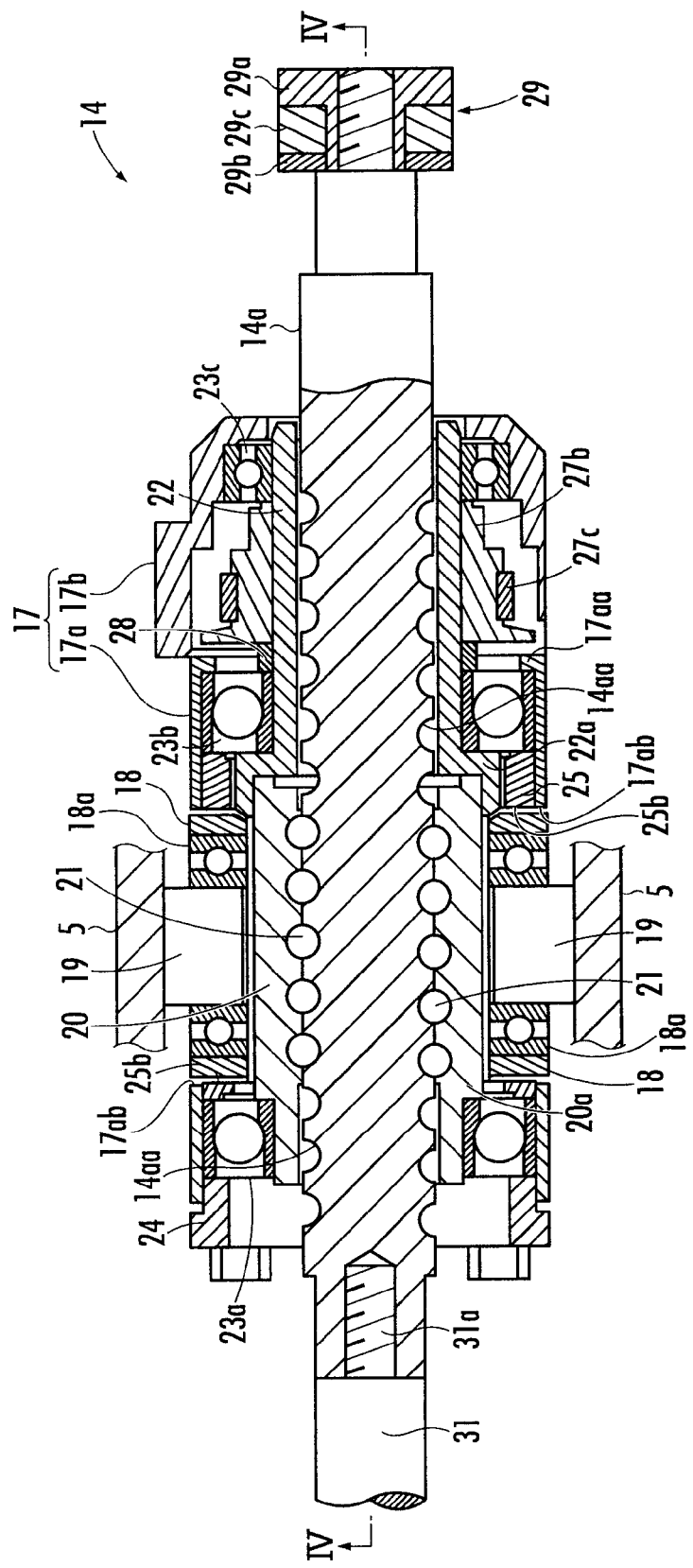
FIG. 3 is a sectional view taken at line in III-III in FIG. 2.

As illustrated in FIG. 3, a pair of bearing members 18 and 18 respectively incorporating bearings 18a is installed on both sides of the main enclosure 17a in the direction orthogonal to the axial center of the linear-motion output shaft 14a (the direction substantially perpendicular to the paper surface of FIG. 2). These bearing members 18 and 18 are secured to the main enclosure 17a such that the respective bearings 18a thereof coaxially oppose.

A support shaft 19, which is protrusively provided such that the support shaft 19 has an axial center parallel to the joint axis of the third joint 8, is fitted from the inner wall of the upper link member 5 into the inner ring of the bearing 18a of each of the bearing member 18. With this arrangement, the enclosure 17 is supported by the upper link member 5 such that the enclosure 17 swings about the axial center of the support shaft 19. Hereinafter, the support shaft 19 will be referred to also as the swing shaft 19.

The main enclosure 17a accommodates an essential section of a ball screw mechanism. In the present embodiment, the linear-motion output shaft 14a serves as the threaded shaft of the ball screw mechanism, a spiral thread groove 14aa being formed in the outer peripheral surface thereof. Further, the ball screw mechanism has a cylindrical nut member 20 externally inserted coaxially to the linear-motion output shaft 14a and a plurality of balls 21 which is retained by the inner peripheral portion of the nut member 20 and which engages with the thread groove 14aa.

The nut member 20 and the balls 21 are accommodated in the main enclosure 17a. Rotating the nut member 20 about the axial center of the linear-motion output shaft 14a causes the balls 21 to roll along the thread groove 14aa while the linear-motion output shaft 14a moves in the direction of the axial center relative to the nut member 20.

The nut member 20 is disposed in the main enclosure 17a such that the central portion thereof in the direction of the axial center is positioned between the swing shafts 19 and 19. More specifically, the nut member 20 is provided such that the axial center of the nut member 20 is orthogonal to the axial centers of the swing shafts 19 and 19 substantially at the center therein.

The cylindrical member 22 is secured to one end of the nut member 20 in the direction of the axial center (the end adjacent to the subsidiary enclosure 17b) and externally inserted onto the linear-motion output shaft 14a coaxially with the nut member 20. The cylindrical member 22 has a clearance between itself and the linear-motion output shaft 14a and extends from the interior of the main enclosure 17a to the interior of the subsidiary enclosure 17b. Further, bearings 23a and 23b, which are coaxial with the nut member 20, are interposed between the outer peripheral surface of the other end of the nut member 20 (the end on the opposite side from the subsidiary enclosure 17b) and the inner peripheral surface of the main enclosure 17a and between the outer peripheral surface of the cylindrical member 22, the outer peripheral surface being adjacent to the nut member 20, and the inner peripheral surface of the main enclosure 17a, respectively. Further, a bearing 23c, which is coaxial with the nut member 20, is interposed between the outer peripheral surface of the end of the cylindrical member 22 opposite from the nut member 20 and the inner peripheral surface of the subsidiary enclosure 17b. With this arrangement, the nut member 20 and the cylindrical member 22 are supported by the enclosure 17 through the intermediary of the bearings 23a, 23b, and 23c such that the nut member 20 and the cylindrical member 22 may integrally rotate about the axial centers thereof, i.e., about the axial center of the linear-motion output shaft 14a.

In the present embodiment, the nut member 20 and the cylindrical member 22 are separate structures. Alternatively, however, the nut member 20 and the cylindrical member 22 may be combined into one piece.

Here, when the nut member 20 rotates, the linear-motion output shaft 14a moves in the direction of the axial center thereof, causing a force in the direction of the axial center (thrust force) to act on the nut member 20.

In the present embodiment, therefore, among the bearings 23a, 23b, and 23c, the bearings 23a and 23b positioned adjacently to the axial ends of the nut member 20 are constituted of angular bearings. In this case, a jaw 20a formed on the outer peripheral surface of the nut member 20 is abutted against an end surface of both end surfaces in the axial direction of the inner ring of the bearing 23a, the end surface being adjacent to the bearing 23b. Further, an annular cap member 24 attached to an end of the main enclosure 17a, which end is opposite from the subsidiary enclosure 17b, is abutted against an end surface of both end surfaces in the axial direction of the outer ring of the bearing 23a, which end surface is on the opposite side from the bearing 23b. Further, a jaw 22a formed on the outer peripheral surface of the cylindrical member 22 is abutted against an end surface out of both axial end surfaces of the inner ring of the bearing 23b, which end surface is adjacent to the bearing 23a. Further, a jaw 17aa formed on the inner peripheral surface of an end portion of the main enclosure 17a, which end portion is adjacent to the subsidiary enclosure 17b, is abutted against an end surface of both axial end surfaces of the outer ring of the bearing 23b, which end surface is on the opposite side from the bearing 23a. With this arrangement, a thrust force which acts on the nut member 20 when the nut member 20 rotates is received by the main enclosure 17a through the intermediary of the bearings (angular bearings) 23a and 23b. In this case, the nut member 20 and the cylindrical member 22 in combination function as inner collars interposed between the bearings 23a and 23b.

A cylindrical outer collar 25 externally inserted onto the nut member 20 is interposed between the outer ring of the bearing 23a and the outer ring of the bearing 23b. The outer ring of the bearing 23a is placed between the outer collar 25 and the annular cap member 24. The outer ring of the bearing 23b is placed between the outer collar 25 and the jaw 17aa of the main enclosure 17a.

The bearing members 18 and 18 for swingably supporting the enclosure 17 by the swing shafts 19 and 19 could alternatively be disposed outside the enclosure 17. This, however, would add to the width of the enclosure 17 in the direction of the axial centers of the swing shafts 19 and 19, i.e., the width in the lateral direction thereof, and also add to the widths of the upper link member 5 and the linear-motion actuator 14 in the lateral direction.

According to the present embodiment, therefore, the main enclosure 17a and the outer collar 25 inside thereof are provided with openings 17ab and 25b at the locations where the bearing members 18 are installed (the locations between the bearings 23a and 23b), as illustrated in FIG. 3. Thus, the bearing members 18 are attached to the main enclosure 17a such that the bearing members 18 are positioned within the openings 17ab and 25b and close to the outer peripheral surface of the nut member 20. More specifically, an opening 25b is formed in the cylindrical outer collar 25 by cutting off a part of the side wall thereof. Further, a side wall of the main enclosure 17a having the square-tubular shape also has an opening 17ab having approximately the same shape as the contour of the bearing member 18. The bearing member 18 is disposed within the openings 17ab and 25b and bolted to the main enclosure 17a. Thus, the width of the main enclosure 17a (the width of the swing shaft 19 in the direction of the axial center thereof) minimizes at the installation location of each of the bearing members 18 by restraining each of the bearing members 18 from projecting from the outer surface of the main enclosure 17a.

Figure 4:
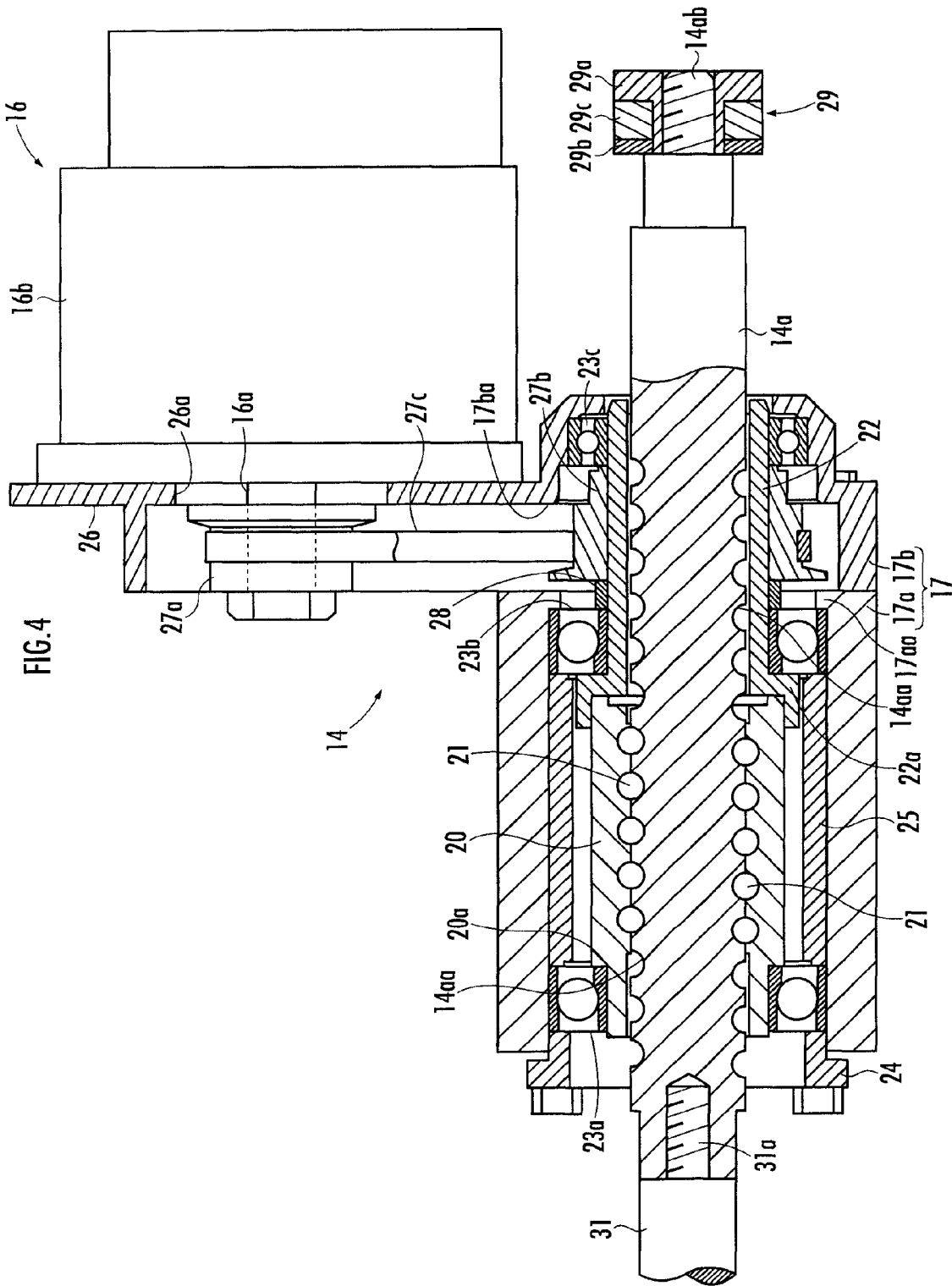
FIG. 4 is a sectional view taken at line IV-IV in FIG. 3.

As illustrated in FIG. 4, a bracket 26 made integral with the subsidiary enclosure 17b is protrusively provided sideways (in the direction substantially orthogonal to the axial center of the linear-motion output shaft 14a and the axial center of the swing shaft 19) from the outer surface of the subsidiary enclosure 17b. In the present embodiment, the bracket 26 protrudes from the subsidiary enclosure 17b toward the guide rail 11 (see FIG. 2). A housing 16b of the electric motor 16 is secured to the bracket 26. In this case, an output shaft (rotating output shaft) 16a of the electric motor 16 is oriented in the directional parallel to the axial center of the linear-motion output shaft 14a, penetrating a hole 26a provided in the bracket 26. Further, the output shaft 16a of the electric motor 16 has a drive pulley 27a secured thereto, the drive pulley 27a being integrally rotational with the output shaft 16a. A side wall of the subsidiary enclosure 17b has a hole 17ba at a location opposing the drive pulley 27a in the direction orthogonal to the axial center of the linear-motion output shaft 14a. The drive pulley 27a opposes the cylindrical member 22 inside the subsidiary enclosure 17b through the hole 17ba.

The subsidiary enclosure 17b accommodates a driven pulley 27b, which is coaxial with the cylindrical member 22 and located between the bearings 23b and 23c. The driven pulley 27b is inserted in the outer peripheral surface of the cylindrical member 22 such that the driven pulley 27b can be rotated integrally with the cylindrical member 22 and the nut member 20, and opposes the drive pulley 27a through the hole 17ba. An end surface of the driven pulley 27b, which end surface is adjacent to the bearing 23c, is abutted against an end surface of the inner ring of the bearing 23c. A cylindrical collar 28 externally inserted onto the cylindrical member 22 is interposed between an end surface of the driven pulley 27b adjacent to the bearing 23b, and the inner ring of the bearing 23b.

Further, a belt 27c is wound around the drive pulley 27a and the driven pulley 27b. These two pulleys 27a and 27b rotate in an interlocking manner by the belt 27c. With this arrangement, a rotational driving force output through the output shaft 16a by the electric motor 16 is transferred to the cylindrical member 22 through the intermediary of a rotation transmitting mechanism (a pulley-belt rotation transmitting mechanism) constituted of the drive pulley 27a, the belt 27c, and the driven pulley 27b. In this case, the nut member 20 is rotationally driven integrally with the cylindrical member 22, and accordingly, the linear-motion output shaft 14a is driven to move in the direction of the axial center thereof. In other words, the rotational driving force of the electric motor 16 is converted into a translational force in the direction of the axial center of the linear-motion output shaft 14a through the pulley-belt rotation transmitting mechanism and the ball screw mechanism described above.

In the present embodiment, the electric motor 16 incorporates a speed reducer, which is not shown. The rotational driving force generated in a rotor of the electric motor 16 is output from the output shaft 16a through the speed reducer.

As illustrated in FIG. 3 and FIG. 4, a stopper member 29 which restricts the movement amount of the linear-motion output shaft 14a is attached to an end of the linear-motion output shaft 14a, which end projects from the interior of the enclosure 17 toward the subsidiary enclosure 17b (hereinafter referred to as "the rear end of the linear-motion output shaft 14a"). The stopper member 29 is constructed of a nut 29a screwed to an external thread 14ab protruding from an end surface of the rear end of the linear-motion output shaft 14a, a washer 29b which is externally inserted onto the external thread 14ab and sandwiched between the end surface of the rear end of the linear-motion output shaft 14a and the nut 29a, and an annular cushioning member 29c. The annular cushioning member 29c is formed of an elastic material, such as urethane rubber, and interposed between the washer 29b and the nut 29a.

In this case, the outside diameter of the stopper member 29 is slightly larger than the outside diameter of the linear-motion output shaft 14a (more specifically, the maximum outside diameter of the portion which projects from the subsidiary enclosure 17b) such that the washer 29b of the stopper member 29 eventually abuts against the end surface of the cylindrical member 22 (the end surface on the opposite side from the nut member 20) when the linear-motion output shaft 14a moves in the direction for the stopper member 29 to approach the subsidiary enclosure 17b (toward the left in FIG. 3 and FIG. 4). This abutting restricts further movement of the linear-motion output shaft 14a. Further, the annular cushioning member 29c elastically deforms to reduce an impact at the time of the abutting. In addition, the washer 29b is disposed on the abutting side of the annular cushioning member 29c to prevent the annular cushioning member 29c from being stuck in the cylindrical member 22 or the like with a resultant malfunction. In the following description, the movement of the linear-motion output shaft 14a which causes the stopper member 29 to move toward the subsidiary enclosure 17b will be referred to as the forward movement of the linear-motion output shaft 14a, while the movement of the linear-motion output shaft 14a in the opposite direction therefrom will be referred to as the backward movement of the linear-motion output shaft 14a.

Here, when the stopper member 29 abuts against the end surface of the cylindrical member 22 in a state wherein the rotational driving force (the rotational driving force in the direction for the linear-motion output shaft 14a to move forward) from the electric motor 16 is acting on the cylindrical member 22, the rotational driving force is applied from the cylindrical member 22 to the stopper member 29. In this case, if the rotational driving force were the one in the direction for loosening the nut 29a of the stopper member 29 relative to the external thread 14ab, then the nut 29a might loosen. For this reason, in the present embodiment, the rotational direction for tightening the nut 29a and the direction of rotation of the nut member 20 when the linear-motion output shaft 14a moves forward are set such that the direction of the rotational driving force applied from the cylindrical member 22 to the stopper member 29 when the forward movement of the linear-motion output shaft 14a causes the stopper member 29 to abut against the end surface of the cylindrical member 22 will be the direction for tightening the nut 29a of the stopper member 29. For example, in the case where the direction of the threading of the external thread 14ab and the nut 29a is set such that the nut 29a is tightened relative to the external thread 14ab by turning the nut 29a clockwise, the direction of threading of the linear-motion output shaft 14a and the nut member 20 is set such that the linear-motion output shaft 14a moves forward (the nut member 20 moves backward relative to the linear-motion output shaft 14a) by turning the nut member 20 of the ball screw mechanism clockwise. This arrangement restrains the rotational driving force in the direction for loosening the nut 29a from acting on the stopper member 29 when the stopper 29 abuts against the end surface of the cylindrical member 22 due to the forward movement of the linear-motion output shaft 14a.

The washer 29b and the annular cushioning member 29c may be secured to the end surface of the cylindrical member 22, which end surface being on the opposite side from the nut member 20, rather than providing them on the rear end portion of the linear-motion output shaft 14a.

The above has described the detailed structure of the linear-motion actuator 14.

Figure 5:
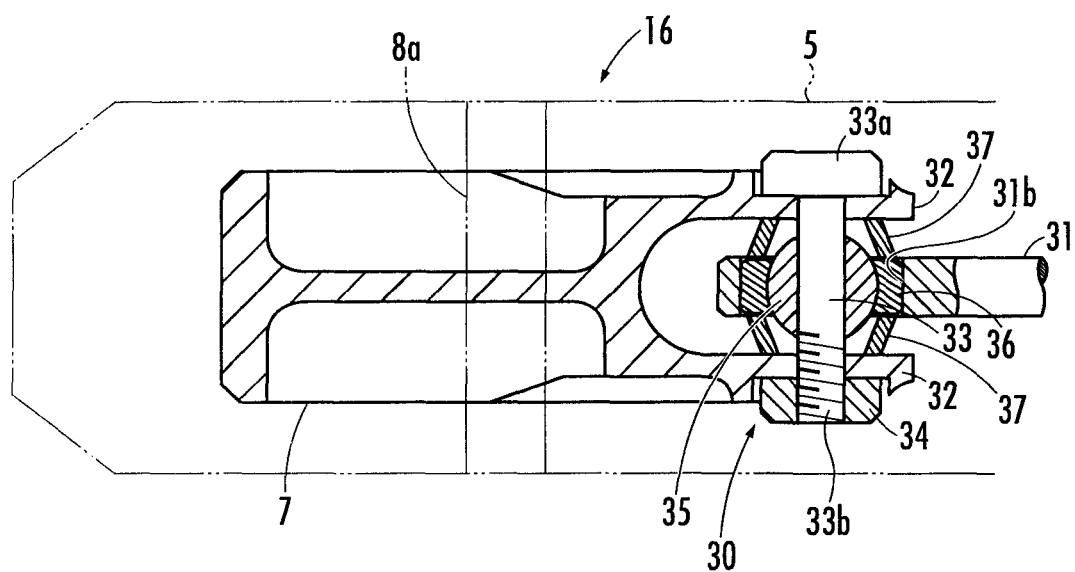
FIG. 5 is a sectional view taken at line V-V in FIG. 2.

The motive power transmit mechanism 15 of each of the drive mechanisms 9 will be described with reference to FIG. 2 and FIG. 5.

The motive power transmit mechanism 15 has a crank arm 30, which is provided on the lower link member 7 coaxially with the joint axis of the third joint 8 (the axial center of the support shaft 8a), and a connecting rod 31 extending coaxially with the linear-motion output shaft 14a between the crank arm 30 and the linear-motion output shaft 14a. Of both ends of the connecting rod 31 in the lengthwise direction, one end adjacent to the linear-motion output shaft 14a is secured to the linear-motion output shaft 14a by screwing an external thread 31a protruding from an end surface of the connecting rod 31 (shown in FIG. 3 and FIG. 4) into the linear-motion output shaft 14a (refer to FIG. 3 and FIG. 4). The other end of the connecting rod 31 is connected to the crank arm 30.

The connecting rod 31 may be constructed integrally with the linear-motion output shaft 14a.

The structure of connection between the connecting rod 31 and the crank arm 30 will be described in more detail with reference to FIG. 5. In the present embodiment, the crank arm 30 is constructed of a pair of protruding portions 32 and 32, which are bifurcately provided from the outer periphery of an upper end portion of the lower link member 7 (a portion supported by a support shaft 8a) such that they oppose each other with an interval provided therebetween in the directional of the axial center of the support shaft 8a, and a pivot pin 33 provided such that it extends across the space between the protruding portions 32 and 32 in the direction of the interval. The axial center of the pivot pin 33 is parallel to the joint axis of the third joint 8 (the axial center of the support shaft 8a) and has a predetermined interval from the joint shaft. The pivot pin 33 is shaped like a bolt, which has a large-diameter head 33a formed on one end thereof and an external thread portion 33b formed on the other end thereof. Further, a nut 34 is screwed onto the external thread portion 33b such that protruding portions 32 and 32 are sandwiched between the nut 34 and the head 33a. Thus, both end portions of the pivot pin 33 is secured to the protruding portions 32 and 32.

A spherical member 35 having a spherical outer surface is inserted in the middle portion (the portion between the protruding portions 32 and 32) of the pivot pin 33. The spherical member 35 is secured to the pivot pin 33 by being held between the head 33a of the pivot pin 33 and the nut 34. The spherical surface center of the spherical member 35 is positioned on the axial center of the pivot pin 33.

The end of the connecting rod 31 adjacent to the third joint 8 is provided with a through hole 31b having a diameter that is larger than the diameter of the spherical member 35. The end of the connecting rod 31 adjacent to the third joint 8 is externally inserted to the spherical member 35 such that the axial center of the through hole 31b is coaxial with the pivot pin 33. In this case, a bush 36 secured to the connecting rod 31 is interposed between the inner peripheral surface of the through hole 31b of the connecting rod 31 and the outer surface (the spherical surface) of the spherical member 35. The bush 36 is in slidable contact with the outer surface of the spherical member 35, thereby connecting (pivotally attaching) the connecting rod 31 to the pivot pin 33 such that it may swing about the axial center of the pivot pin 33. Thus, the structure of the connection, i.e., the structure of the pivotal connection, between the connecting rod 31 and the crank arm 30 is a so-called spherical joint structure.

Here, while the spherical joint structure permits a lightweight and small structure, the spherical joint structure has a certain measure of clearance between the connecting rod 31 and the protruding portions 32, 32. The clearance easily causes a minute movement of the connecting rod 31 other than a swing motion about the axial center of the pivot pin 33, namely, a minute movement about an axis orthogonal to the axial center of the pivot pin 33. In other words, the movement of the connecting rod 31 relative to the pivot pin 33 is apt to include a play motion other than the swing motion about the axial center of the pivot pin 33. To solve the problem, according to the present embodiment, elastic resinous spring washers 37 and 37 are interposed between each of the protruding portions 32 and 32 and the connecting rod 31. These spring washers 37 and 37 are externally inserted to the pivot pin 33 such that the spring washers 37 and 37 are pushed in the direction of the axial center of the pivot pin 33 at between the bush 36 and the respective protruding portions 32 and 32. Thus, the spring washers 37 and 37 function to maintain an almost constant clearance between the connecting rod 31 in the direction of the axial center of the pivot pin 33 and each of the protruding portions 32 and 32. This arrangement restrains movement plays of the connecting rod 31.

Supplementally, in the present embodiment, the connecting rod 31 is secured to the linear-motion output shaft 14a, so that the pivot pin 33 corresponds to the connecting portion of the linear-motion output shaft 14a relative to the crank arm 30.

The above has described the details of the motive power transmit mechanism 15.

In the motive power transmit mechanism 15, when the electric motor 16 is operated to cause the linear-motion output shaft 14a of the linear-motion actuator 14 to generate a translational force in the direction of the axial center thereof, the generated translational force is applied to the pivot pin 33 of the crank arm 30 through the connecting rod 31. For example, a translational force F acts, as indicated by an arrow F in FIG. 2. At this time, the pivot pin 33 is decentered relative to the joint axis of the third joint 8, so that the translational force F acting on the pivot pin 33 (more specifically, a component of the translational force F, which component is in the direction orthogonal to the straight line connecting the joint axis of the third joint 8 (the axial center of the support shaft 8a) and the pivot pin 33) causes a moment (torque) about the joint axis of the third joint 8 to act on the lower link member 7. This torque rotationally drives the lower link member 7 relative to the upper link member 5, bending or stretching the leg link 3 at the third joint 8. In this case, according to the present embodiment, the pivot pin 33 is disposed above the straight line connecting the joint axis of the third joint 8 (the axial center of the support shaft 8a) and the swing shaft 19, as observed in the direction of the axial center of the joint axis of the third joint 8. Hence, the third joint 8 is driven in the direction in which the leg link 3 stretches by causing the linear-motion output shaft 14a of the linear-motion actuator 14 to generate a translational force in the backward movement direction (a translation force which provides a tensile force between the pivot pin 33 of the crank arm 30 and the nut member 20). In this case, the axial centers of the swing shafts 19 and 19 for swinging the enclosure 17 as the leg link 3 bends or stretches are orthogonal to the axial center of the nut member 20 in the nut member 20 of the ball screw mechanism, thus making it possible to restrain, as much as possible, a bending force from acting on the linear-motion output shaft 14a inside the nut member 20. This allows the linear-motion output shaft 14a to stably and smoothly move in the axial direction as the nut member 20 is rotationally driven.

The above has described the major mechanical construction of the walking assistance device A according to the present embodiment. Although not illustrated, the walking assistance device A is provided with a controller including a microcomputer and the like and a power battery at appropriate locations therein in order to control the operation of the electric motor 16 of the linear-motion actuator 14. For example, the controller is installed inside the base frame 1b of the seating portion 1, and the power battery is installed to the upper link member 5. Further, the walking assistance device A is provided with sensors for detecting tread forces of a user and sensors for detecting bending angles of the leg links 3, and outputs of these sensors are used to control the operation of the electric motor 16.

In the walking assistance device A, the third joint 8 of one of the leg links 3 which is in contact with the ground is driven such that, when the user walks, load (upward translational force) for supporting a part of the weight of the user steadily acts on the user from the seating portion 1. More specifically, a translational force of a predetermined value (e.g., a translational force for supporting a predetermined percentage (e.g., 20%) of the weight of the user) is defined as target load to be applied from the seating portion 1 to the user, and a torque of the third joint 8 (a torque in the direction in which the leg link 3 stretches) required to generate the target load is determined by arithmetic processing by a controller, which is not shown. Then, the output torque of the electric motor 16 is controlled such that the required torque acts on the third joint 8. Thus, the target load is applied from the seating portion 1 to the user, thereby reducing the burden on the legs of the user.

The characteristics of the drive mechanism 9 will now be described with reference to FIG. 6 to FIG. 9.

Figure 6:
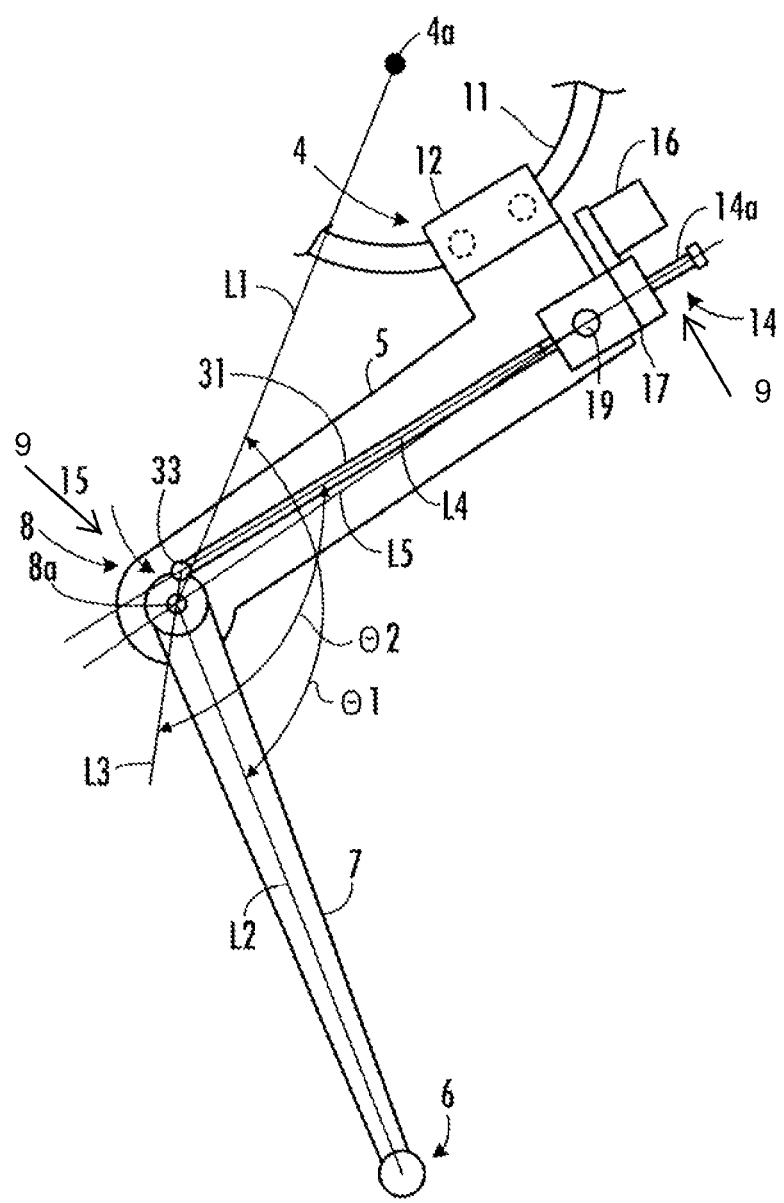
FIG. 6 is a diagram schematically illustrating the construction of an essential section related to one leg link of the walking assistance device in FIG. 1.
Figure 7:
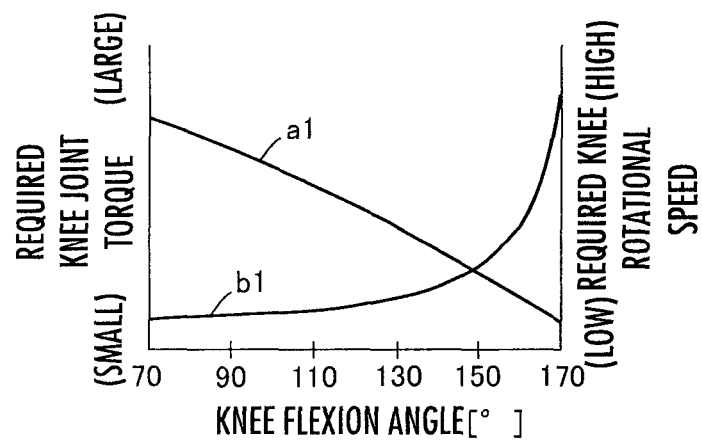
FIG. 7 is a graph illustrating the characteristics of a drive mechanism of the walking assistance device in FIG. 1.

Referring to FIG. 6, in the following description, when each of the leg links 3 is observed in the direction of the axial center of the joint axis of the third joint 8, i.e., in the direction of the axial center of the support shaft 8a (in other words, when each of the leg links 3 is observed by projecting it on a plane orthogonal to the direction of axial center of the joint axis of the third joint 8), an angle $\theta 1$ formed by a straight line L1, which connects the support shaft 8a of the third joint 8 and a curvature center 4a of the guide rail 11, and a straight line L2, which connects the support shaft 8a of the third joint 8 and the second joint 6, is referred to as a knee flexion angle $\theta 1$ of the leg link 3. The knee flexion angle $\theta 1$ in the figure is set such that it monotonously reduces from an angle closer to 180° toward an angle closer to 0° as the flexion degree of the leg link 3 at the third joint 8 increases, that is, as the leg link 3 bends at the third joint 8.

In the case where each of the leg links 3 is observed in the direction of the axial center of the joint axis of the third joint 8, an angle $\theta 2$ formed by a straight line L3, which connects the support shaft 8a of the third joint 8 and the pivot pin 33 serving as the pivot portion of the linear-motion output shaft 14a relative to the crank arm 30, and a straight line L4, which passes the pivot pin 33 and which is parallel to the axial center of the linear-motion output shaft 14a (the line coinciding with the axial center of the linear-motion output shaft 14a in the present embodiment), is referred to as a pivot pin phase angle $\theta 2$. The pivot pin phase angle $\theta 2$ corresponds to the first angle in the present invention. The pivot pin phase angle $\theta 2$ in the figure is set such that the value of $\theta 2$ in a state wherein the straight lines L3 and L4 are in alignment (in a state wherein the joint axis of the third joint 8 is positioned on the axial center of the linear-motion output shaft 14a) is 180°, and from this state, $\theta 2$ monotonously decreases toward 0° as the pivot pin 33 rotates counterclockwise about the joint axis of the third joint 8, that is, as the knee flexion angle $\theta 1$ decreases.

In the present embodiment, the interval between the support shaft 8a of the third joint 8 and the curvature center 4a of the guide rail 11 and the interval between the support shaft 8a of the third joint 8 and the second joint 6 are set such that the knee flexion angle $\theta 1$ is slightly smaller than 180° (e.g., approximately) 170° when the user of the walking assistance device A is standing upright with his/her both legs stretched straight. In this case, according to the present embodiment, the knee flexion angle $\theta 1$ of each of the leg links 3 can be changed in the range of, for example, about 70° to about 170°, due to mechanical restrictions of the stopper member 29 and the like. Hereinafter, the range will be referred to as the variable zone of the knee flexion angle $\theta 1$. Incidentally, the range of the knee flexion angle $\theta 1$ implemented while the user is in a normal walking mode on a flatland approximately ranges from 130° to 170°.

Here, it should be noted that, even if target load to be applied to the user from the seating portion 1 when the user walks or stands up remains constant, the torque of the third joint 8 of the leg link 3 required to generate the target load (hereinafter referred to as "the required knee joint torque") changes according to the knee flexion angle $\theta 1$ of the leg link 3. For example, in the walking assistance device A according to the present embodiment, the required knee joint torque of the third joint 8 when the target load is fixed changes according to the knee flexion angle $\theta 1$, as indicated by a1 in the graph of FIG. 7. More specifically, the required knee joint torque decreases as the angle $\theta 1$ increases, that is, as the flexion degree of the leg link 3 decreases. This is because the distance between the action line of the load (upward translational force) from the seating portion 1 to the user and the third joint 8 decreases as the knee flexion angle $\theta 1$ increases.

Further, the sensitivity to a change in the height of the seating portion 1 (the height from the ground contact surface of the foot-worn portion 2) relative to a change in the knee flexion angle $\theta 1$ (the ratio of a change amount of the height of the seating portion 1 with respect to a minute change amount of $\theta 1$) also changes according to the knee flexion angle $\theta 1$. Hence, in the case where the user attempts to move his/her body trunk upward or downward at a certain speed when walking or standing up, the rotational speed of the third joint 8 required to cause the seating portion 1 to follow the motion (the rotational speed of the lower link member 7 relative to the upper link member 5; hereinafter referred to as "the required knee rotational speed") will change according to the knee flexion angle $\theta 1$. In the walking assistance device A of the present embodiment, the required knee rotational speed changes according to the knee flexion angle $\theta 1$, as indicated by, for example, b1 in the graph of FIG. 7. More specifically, as the angle $\theta 1$ increases, i.e., as the flexion degree of the leg link 3 decreases, the required knee rotational speed increases. In this case, as the angle $\theta 1$ approaches 180°, the required knee rotational speed suddenly increases.

As described above, the required knee joint torque and the required knee rotational speed in the walking assistance device A change with the knee flexion angle $\theta 1$. For this reason, in the case where the speed reduction ratio between the electric motor 16 of the linear-motion actuator 14 and the third joint 8 is fixed, that is, in the case where the relationship between the torque of the third joint 8 and the output torque of the electric motor 16 and the relationship between the rotational speed of the third joint 8 and the rotational speed of the electric motor 16 are respectively set to be proportional relations, the variation width of an output torque required of the electric motor 16, i.e., the difference between the maximum value and the minimum value of a required output torque) and the variation width of a rotational speed, i.e., the difference between the maximum value and the minimum value of a required rotational speed, will be relatively large.

Figure 8:
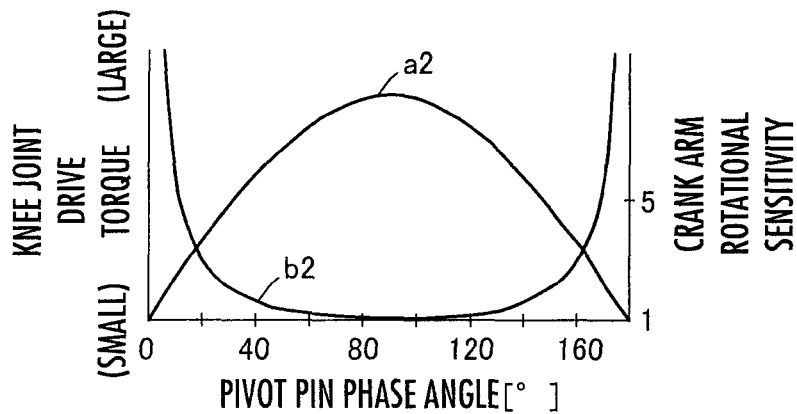
FIG. 8 is another graph illustrating the characteristics of the drive mechanism of the walking assistance device in FIG. 1.

Meanwhile, in the motive power transmit mechanism 15, in the case where the motive power (translational force) output from the linear-motion output shaft 14a of the linear-motion actuator 14 is fixed, that is, in the case where the output torque of the electric motor 16 is fixed, the torque to be imparted to the third joint 8 through the intermediary of the crank arm 30 (hereinafter referred to as "the Knee joint drive torque") will change as indicated by a2 in the graph of FIG. 8 according to the pivot pin phase angle $\theta 2$. More specifically, in the case where the pivot pin phase angle $\theta 2$ is 90°, the knee joint drive torque reaches its maximum value, then the knee joint drive torque reduces as the pivot pin phase angle $\theta 2$ decreases from 90° toward 0° or increases toward 180°. Further, the sensitivity to a change in the pivot pin phase angle $\theta 2$ relative to a displacement of the linear-motion output shaft 14a in the direction of axial center (the ratio of the change amount of $\theta 2$ with respect to a minute displacement amount of the linear-motion output shaft 14a in the direction of axial center; hereinafter referred to as "the crank arm rotational sensitivity") changes as indicated by b2 in the graph of FIG. 8 in response to the pivot pin phase angle $\theta 2$. More specifically, in the case where the pivot pin phase angle $\theta 2$ is 90°, the crank arm rotational sensitivity reaches its minimum value. Further, as the pivot pin phase angle $\theta 2$ decreases from 90° toward 0° or increases toward 180°, the crank arm rotational sensitivity increases. The crank arm rotational sensitivity in FIG. 8 is indicated in relative values, and the sensitivity when $\theta 2=90°$ is defined as 1.

Supplementally, the change amount of the pivot pin phase angle $\theta 2$ and the change amount of the knee flexion angle $\theta 1$ agree with each other. The change amount of the linear-motion output shaft 14a in the direction of axial center is proportional to the change amount of the rotational angle of the output shaft 16a of the electric motor 16. In other words, therefore, the crank arm rotational sensitivity indicates the sensitivity of a change in the pivot pin phase angle $\theta 2$ or the knee flexion angle $\theta 1$ in response to a change in the rotational angle of the output shaft 16a of the electric motor 16.

Here, attention will be focused on the characteristic of the knee joint drive torque relative to $\theta 2$ in the case where the pivot pin phase angle $\theta 2$ is an angle of 90° or more. As the angle $\theta 2$ increases, the knee joint drive torque decreases. This characteristic is the same as the characteristic of the aforesaid required knee joint torque relative to the knee flexion angle $\theta 1$. Further, attention will be focused on the characteristic of the crank arm rotational sensitivity relative to $\theta 2$ in the case where the pivot pin phase angle $\theta 2$ is an angle of 90° or more. As the angle $\theta 2$ increases, the crank arm rotational sensitivity increases. This characteristic is the same as the characteristic of the required knee rotational speed relative to the knee flexion angle $\theta 1$.

Based on the characteristics described above, in the present embodiment, the relationship between the knee flexion angle $\theta 1$ denoting the flexion degree of the leg link 3 and the pivot pin phase angle $\theta 2$ as the first angle is set such that the pivot pin phase angle $\theta 2$ changes from an angle closer to 180° (an angle closer to the straight angle) to an angle closer to 90° (an angle closer to the right angle) as the knee flexion angle $\theta 1$ decreases (as the flexion degree of the leg link 3 at the third joint 8 increases from the flexion degree in the state wherein the user is in the upright posture) from an angle value (170° in the present embodiment) in the state wherein the user is in the upright posture.

Further, in this case, the relationship between $\theta 1$ and $\theta 2$ is set such that the value of $\theta 2$ in the case where $\theta 1$ takes an angle value in the state where the user is in the upright posture (hereinafter referred to as "the pivot pin phase angle in the upright posture") will be sufficiently close to the straight angle)(180° rather than the right angle (90°). In other words, the relationship between $\theta 1$ and $\theta 2$ is set such that the angular difference between the pivot pin phase angle in the upright posture and the straight angle is minute (a value in the vicinity of zero), as compared with the angular difference between the pivot pin phase angle in the upright posture and the right angle.

For example, the relationship between $\theta 1$ and $\theta 2$ is set such that, for any value of the knee flexion angle $\theta 1$, the value of $\theta 1$ virtually agrees with the value of $\theta 2$ or the value of $\theta 2$ is slightly larger than the value of $\theta 1$. The change amount of $\theta 1$ and the change amount of $\theta 2$ will be the same. Hence, in order to set the relationship between $\theta 1$ and $\theta 2$ as described above, the phase of the pivot pin 33 may be set such that, in the case where $\theta 1$ takes a particular value, e.g., an angle obtained when the user is in the upright posture, the value of $\theta 1$ and the value of $\theta 2$ virtually agree or the value of $\theta 2$ is slightly larger than the value of $\theta 1$. Further, in the present embodiment, the knee flexion angle $\theta 1$ implemented while the user is walking on a flatland ranges from about 130° to about 170°, as described above, and the range of the value of $\theta 2$ corresponding to the aforesaid range is 0° to 90°.

Thus, in the walking assistance device A of the present embodiment, which has the set relationship between $\theta 1$ and $\theta 2$, the output torque of the electric motor 16 required to cause the drive torque to be imparted to the third joint 8 to agree with the aforesaid required knee joint torque (hereinafter referred to as "the required motor torque") changes according to the knee flexion angle $\theta 1$, as indicated by a3 of the graph in FIG. 9. Similarly, the rotational speed of the electric motor 16 required to cause an actual rotational speed of the third joint 8 to agree with the aforesaid required knee rotational speed (hereinafter referred to as "the required motor rotational speed") changes according to the knee flexion angle $\theta 1$, as indicated by a3 of the graph in FIG. 9.

In this case, since the relationship between $\theta 1$ and $\theta 2$ has been set as described above, the knee joint drive torque increases as $\theta 1$ decreases over the majority of the range (the range in which $\theta 1$ exceeds substantially) 90° in the variable zone of the knee flexion angle $\theta 1$. Further, over the majority of the range, the crank arm rotational sensitivity increases as the angle $\theta 1$ increases. Hence, over the majority of the range, including the range of the angle $\theta 1$ implemented while the user is walking on a flatland, the trend of changes in the knee joint drive torque and the trend of change in the crank arm rotational sensitivity relative to changes in the angle $\theta 1$ are the same as the trend of changes in the required knee joint torque and the trend of changes in the required knee rotational speed, respectively. Further, over the range in the variable zone of the knee flexion angle $\theta 1$, excluding the aforesaid majority of range, the knee joint drive torque decreases as the angle $\theta 1$ decreases; however, the width of the decrease thereof is sufficiently small, as compared with the variation width of the knee joint drive torque in the aforesaid majority of range. Similarly, over the range excluding the aforesaid majority of range, the crank arm rotational sensitivity increases as the angle $\theta 1$ decreases; however, the width of the increase thereof is sufficiently small, as compared with the variation width of the crank arm rotational sensitivity in the aforesaid majority of range.

Figure 9:
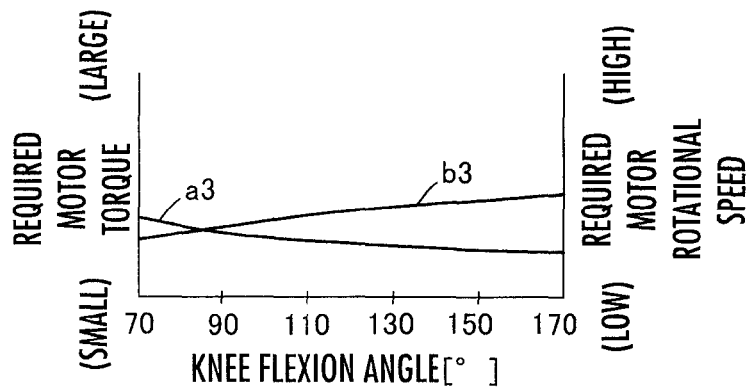
FIG. 9 is still another graph illustrating the characteristics of the drive mechanism of the walking assistance device in FIG. 1.

Thus, as indicated by a3 and b3 in the graph of FIG. 9, the required motor torque and the required motor rotational speed do not exhibit significant changes in response to changes in the variable zone of the knee flexion angle $\theta 1$, and the maximum value of the required motor torque and the maximum value of the required motor rotational speed thereof are also relatively small. This means that the maximum value and the variation width of a required motor torque in the variable zone of the knee flexion angle θ1 and also the maximum value and the variation width of a required motor rotational speed thereof will be relatively small, whereas the maximum value and the variation width of a required knee joint torque in the variable zone of the knee flexion angle θ1 and the maximum value and the variation width of a required knee rotational speed thereof will be relatively large. Hence, in the electric motor 16, even if the maximum value and variation width of an output torque thereof and the maximum value and variation width of a rotational speed thereof are relatively small, the knee joint torque required to cause target load to act on the user from the seating portion 1, and the knee rotational speed required to cause the seating portion 1 to promptly follow a vertical movement of the body trunk of the user can be implemented. This easily allows the electric motor 16 to be smaller, lighter-weight, and less costly. Consequently, the linear-motion actuator 14 can be easily made smaller, lighter-weight, and less costly.

In the embodiment described above, the load transmit portion has been formed of the seating portion 1 having the saddle-shaped seat 1a. Alternatively, however, the load transmit portion may be formed of a harness-shaped flexible member to be attached around the waist of a user. The load transmit portion preferably has a portion which comes in contact with the crotch of the user in order to apply an upward translational force to the body trunk of the user.

Further, in the embodiment described above, the first joint 4 has the arcuate guide rail 11, which is set such that the curvature center 4a of the guide rail 11 serving as the longitudinal swing support point of each of the leg links 3 is positioned above the seating portion 1. Alternatively, however, the first joint 4 may have a simple joint structure in which, for example, the upper end of the leg link 3 is rotatably supported by a shaft in the crosswise direction (the lateral direction) besides or below the seating portion 1.

To assist the walking of a user having a problem with one leg due to bone fracture or the like, only one of the right and the left leg links 3 and 3 in the embodiment, whichever leg the user has a problem with, may be used and the other leg link may be omitted.

Further, in the embodiment described above, the linear-motion actuator 14 has been constructed of the electric motor 16 and the ball screw mechanism. Alternatively, however, a cylinder type linear-motion actuator may be used.

In addition, according to the embodiment described above, the variable zone of the knee flexion angle θ1 is an angle range that is wider than 90°. Alternatively, however, the length of the upper link member 5 or the lower link member 7 of the leg link 3 can be set such that the variable zone may have an angle range that is smaller than 90°. In this case, the relationship between θ1 and θ2 may be set such that the values of the pivot pin phase angle θ2 corresponding to all angle values in the variable zone of the knee flexion angle θ1 fall within the range of 0° to 90°. This makes it possible to increase the knee joint drive torque to increase as the angle θ1 increases and to increase the crank arm rotational sensitivity as the angle θ1 decreases over the entire variable zone of the knee flexion angle θ1. This consequently makes it possible to minimize the maximum value and variation width of a required motor torque and the maximum value and variation width of a required motor rotational speed.

What is claimed is:
1. A walking assistance device, comprising:
a load transmit portion adapted to transmit load for supporting a part of the weight of a user to a body trunk of the user;
a foot-worn portion adapted to be attached to a foot of the user;
a leg link which connects the foot-worn portion to the load transmit portion, the leg link comprising an upper link member extended from the load transmit portion via a first joint, a lower link member extended from the foot-worn portion via a second joint, and a third joint which bendably connects the upper link member and the lower link member; and
a drive mechanism for driving the third joint,
wherein the drive mechanism has a crank arm fixed to the lower link member and a linear-motion actuator which has a linear-motion output shaft, one end thereof being connected to the crank arm, and which is mounted on the upper link member such that the linear-motion actuator is swingable about an axial center of a swing shaft parallel to a joint axis of the third joint, and the drive mechanism is constructed to convert a translational force output from the linear-motion output shaft of the linear-motion actuator into a rotational driving force for the third joint through an intermediary of the crank arm,
a relationship between a first angle and a flexion degree of the leg link at the third joint is set such that the first angle, which is an angle formed by a first straight line connecting a joint axis and a connecting portion of the linear-motion output shaft relative to the crank arm, and a second straight line which passes the connecting portion and which is oriented in a direction parallel to an axial center of the linear-motion output shaft, changes from a substantially straight angle when the flexion degree of the leg link at the third joint is the flexion degree associated with an upright posture state of the user, toward a substantially right angle as the flexion degree of the leg link at the third joint increases from that associated with the upright posture state as the lower link member bends relative to the upper link member at the third joint,
the linear-motion actuator has the linear-motion output shaft functioning as a screw shaft with thread grooves formed in an outer peripheral surface thereof, a nut member which retains, in an inner peripheral portion thereof, a plurality of balls engaged with the thread grooves of the linear-motion output shaft and which is concentrically threaded to the linear-motion output shaft through an intermediary of the plurality of balls, an enclosure which rotatably accommodates the nut member therein and which is supported by the upper link member such that the enclosure may swing about the axial center of the swing shaft together with the nut member and the linear-motion output shaft, and a rotational actuator which has a rotational output shaft for imparting a rotational driving force to the nut member and which is installed to the enclosure such that the rotational actuator may swing about the axial center of the swing shaft together with the enclosure, the swing shaft being provided such that the axial center thereof is orthogonal to the axial center of the nut member at inside the nut member, and
the nut member is rotatably supported by the enclosure through an intermediary of a pair of angular bearings inserted in an outer periphery of the nut member with an interval provided in the direction of the axial center of the nut member, a side wall of the enclosure has an opening in a place within the interval between the pair of angular bearings, and the swing shaft is inserted in a bearing member attached to the enclosure such that the bearing member is accommodated in the opening between the pair of angular bearings.

2. The walking assistance device according to claim 1, wherein the relationship between the first angle and the flexion degree is set such that, for any value of a third joint flexion angle, the third joint flexion angle substantially agrees with a value of the first angle.

3. The walking assistance device according to claim 2, wherein the first joint includes an arcuate guide rail attached to the load transmit portion, and the third joint flexion angle is an angle formed by a third straight line connecting the joint axis and a curvature center of the arcuate guide rail, and a fourth straight line connecting the joint axis and the second joint.

4. The walking assistance device according to claim 1, wherein the relationship between the first angle and the flexion degree is set such that, for any value of a third joint flexion angle, the value of the third joint flexion angle is less than a value of the first angle.

5. The walking assistance device according to claim 4, wherein the first joint includes an arcuate guide rail attached to the load transmit portion, and the third joint flexion angle is an angle formed by a third straight line connecting the joint axis and a curvature center of the arcuate guide rail, and a fourth straight line connecting the joint axis and the second joint.

6. The walking assistance device according to claim 1, wherein the crank arm is fixed to the lower link member so as to be movable along an arc having the joint axis of the third joint as a center point.

7. The walking assistance device according to claim 6, wherein the crank arm is fixed to the lower link member so as to be integrally movable with the lower link member as the lower link member bends relative to the upper link member at the third joint.

8. The walking assistance device according to claim 7, wherein the crank arm is connected to the upper link member only through an intermediary of the lower link member and the linear-motion actuator.

9. The walking assistance device according to claim 1, wherein the load transmit portion includes a seating portion adapted for a user to sit thereon.

10. The walking assistance device according to claim 1, wherein the relationship between the first angle and the flexion degree of the leg link at the third joint is set such that the first angle continuously changes from the substantially straight angle when the flexion degree of the leg link at the third joint is the flexion degree associated with the upright posture state of the user, toward the substantially right angle as the flexion degree of the leg link at the third joint increases from that associated with the upright posture state as the lower link member bends relative to the upper link member at the third joint.

* * * * *